US009073799B2

(12) United States Patent
Lodwig et al.

(10) Patent No.: US 9,073,799 B2
(45) Date of Patent: Jul. 7, 2015

(54) ORGANIC SOIL TREATMENT COMPOUND AND METHOD OF MAKING AND USING

(75) Inventors: James W. Lodwig, Wenatchee, WA (US); Kenneth P. Krueger, Spokane, WA (US)

(73) Assignee: EcoTrac Organics Inc., East Wenatchee, WA (US)

( * ) Notice: Subject to any disclaimer, the term of this patent is extended or adjusted under 35 U.S.C. 154(b) by 120 days.

(21) Appl. No.: 12/840,979

(22) Filed: Jul. 21, 2010

(65) Prior Publication Data
US 2011/0023566 A1 Feb. 3, 2011

Related U.S. Application Data

(60) Provisional application No. 61/230,067, filed on Jul. 30, 2009.

(51) Int. Cl.
C05F 5/00 (2006.01)
C05F 11/00 (2006.01)

(52) U.S. Cl.
CPC ............... C05F 5/006 (2013.01); C05F 11/00 (2013.01)

(58) Field of Classification Search
CPC ........... C05F 5/006; C05F 11/00; C05F 7/00; C05F 11/02; C05F 11/08; C05G 3/0041
USPC ................................................. 71/11, 23, 24
See application file for complete search history.

(56) References Cited

U.S. PATENT DOCUMENTS

| 5,762,678 A * | 6/1998 | Hiles ................................ 71/23 |
| 2004/0111968 A1 | 6/2004 | Day et al. ........................ 48/197 |
| 2011/0023566 A1 * | 2/2011 | Lodwig et al. .................... 71/14 |

FOREIGN PATENT DOCUMENTS

| EP | 0 716 056 | 6/1996 |
| JP | 2000-212561 | 8/2000 |
| JP | 2005-306716 | 11/2005 |

OTHER PUBLICATIONS

Biochar India, "Bocashi or Bokashi" Geoecology Energy Organization pp. 1-5 (2002).*
Bocashi Boosts Growth, Maine Organic Farmers and Gardeners Association, Winter 2005/2006.*
Nguyen et al., "Biochar degradation under varying water regimes and temperatures". Cornel University., 2000.*
Iannotti "What is a Soilless Potting Mix?" pp. 1-2. May 22, 2007.*
Kimetu et al. "Reversibility of Soil Productivity Decline with Organic Matter of Differing Quality Along a Degradation Gradient". Ecosystems (2008) 11: 726-739.*
Lehmann et al., "Bio-Char Sequestration in Terrestrial Ecosystems—A Review," *Mitigation and Adaptation Strategies for Global Change* 11:403-427, 2006.
Warnock et al., "Mycorrhizal responses to biochar in soil—concepts and mechanisms," *Plant Soil* 300:9-20, 2007.

* cited by examiner

*Primary Examiner* — Jennifer A Smith
(74) *Attorney, Agent, or Firm* — Seed IP Law Group PLLC

(57) ABSTRACT

A composition is provided that includes particulates from wood, chaff, hulls, crop compost, biochar, or waste residue, wood or crop ash and biochar, and a nitrogen source from waste residue from gasification processes, food processing waste water or other residual by-products of forest, aquatic, food or feed processing. Ideally, all of the components are environmentally friendly, from natural products, and free of manufactured chemicals.

8 Claims, 1 Drawing Sheet

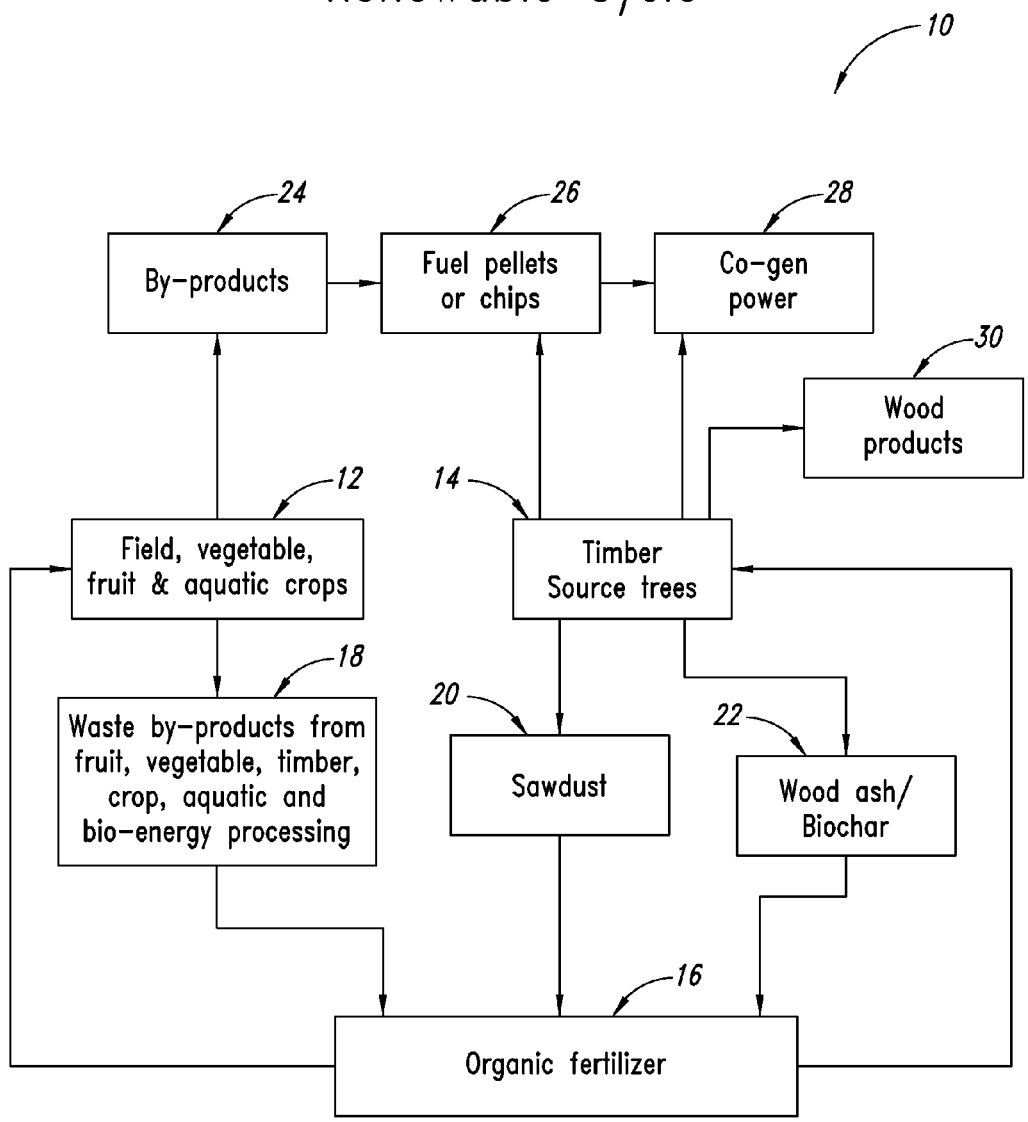

ORGANIC SOIL TREATMENT COMPOUND AND METHOD OF MAKING AND USING

BACKGROUND

1. Technical Field

The present disclosure relates generally to ground and soil treatment compounds and amendments using only plant by-products that are derived from living organisms, primarily natural, organic by-products of timber, agricultural, aquatic processing operations and bio-energy processes from agricultural by-products and, in addition, to a renewable energy and resource process for making the same.

2. Description of the Related Art

The use of fertilizers to enhance plant growth is well established in modern agriculture. Numerous mixtures of beneficial soil amendments and soil treatments are available commercially, including those using primarily non-organic ingredients. It has been recognized that when mixed with soil, ash and biochar provides a variety of major and minor nutrients necessary for plant and tree growth. Likewise, the use and benefit of sawdust as a soil amendment, mulch, or compost ingredient is known.

One known process pasteurizes food waste into a nitrogen based fertilizer. This product is expensive to manufacture and environmentally unfriendly because it requires substantial energy for the pasteurization process. In addition, chemical agents used in pasteurization are detrimental to the environment and present a health hazard.

BRIEF SUMMARY

In accordance with one embodiment of the present disclosure, a composition is provided that includes particulates from wood, chaff, hulls, crop compost, biochar, or waste residue, wood or crop ash and biochar, and a nitrogen source from waste residue generated from gasification processes, food processing waste water or other residual by-products of forest, aquatic, and food or feed processing. Ideally, all of the components are environmentally friendly, derived from natural products, and free of manufactured chemicals.

In accordance with another aspect of the present disclosure, the wood particulate in the composition is formed of sawdust, such as high grade fine softwood or hardwood fiber or a combination of both.

In accordance with another aspect of the present disclosure, the wood ash and biochar is formed of ash or biochar from the incineration or pyrolysis of natural products, such as fly ash and biochar, boiler ash and biochar, or bottom ash and biochar, such as that generated as a by-product from timber processing operations or a wood biomass co-generation plant or from cook stoves or combination of the foregoing.

In accordance with another aspect of the present disclosure, the wood or agricultural crop ash and biochar is a form of biomass ash and biochar.

In accordance with yet another aspect of the present disclosure, the nitrogen is formed from a nitrogen source such as dried waste by-product, residue, or by-product created from food, crop, or timber waste water treatment or bio-energy process residue from crop or agricultural biomass.

In accordance with yet a further aspect of the present disclosure, the nitrogen is formed from crop waste such as mint or canola or other crops after the oils have been extracted.

In accordance with yet another aspect of the present disclosure, the nitrogen is formed from crops such as coffee wherein the beans, green or roasted, ground or not ground as well as the coffee bean chaff produced as a by-product of the roasting process.

In accordance with still yet a further aspect of the present disclosure, the composition is formed by volume of 10-40% of the wood or crop waste particulate, 10-40% of the wood or agriculture crop ash and biochar, and 20-80% of the nitrogen, such as a nitrogen source that is formed from dried waste by-product, residue, food such as coffee beans or food by-product created from food, crop, or timber processing, or bio-energy processing. Ideally the composition is compressed into pellets or other usable form.

As will be readily appreciated from the foregoing, the present disclosure provides a renewable process for manufacturing ground and soil treatment compounds using only plant by-products. The disclosure further provides products of that process, including a related fertilizer compound, for improving plant growth. The described compounds primarily are comprised of natural living organism by-products from timber or aquatic processing or crop processing operations or any combination thereof, and can include one or more of the following, individually or in various combinations thereof, without limitation: tree roots, agriculture crops, food process residue, aquatic plant residue and agricultural bio-energy process residue. In addition, the disclosed process provides a renewable resource whereby plant, tree, and crop biomass are used to enhance growth in new plants, crops, grasses, and timber resources using environmentally friendly products and processes.

As will be readily appreciated from the foregoing, the present disclosure provides a unique combination of natural—not manufacturing or animal waste—products that, when combined, have the properties to be able to be compressed into a usable form that transforms what would otherwise be waste, which requires disposal, into a material that has very desirable nutrient qualities for growing plants.

BRIEF DESCRIPTION OF THE SEVERAL VIEWS OF THE DRAWINGS

The foregoing and other features and advantages of the present disclosure will be more readily appreciated as they become better understood when taken in conjunction with the accompanying drawings wherein:

FIG. 1 is a flow chart showing an embodiment of the present disclosure illustrating the process of reclaiming, recycling, and renewing waste.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with plants, plant by-products and timber by-products, including but not limited to the production of timber products that yields timber sawdust have not been shown or described in order to avoid unnecessarily obscuring descriptions of the embodiments.

For the purposes of this document, "organic" is defined as "of, relating to, or derived from living organisms." The term "environmentally friendly" means, without limitation, no adverse affect on the environment. More particularly, environmentally friendly (also eco-friendly, nature friendly, and green) are synonyms used to refer to goods and services, laws, guidelines and policies considered to inflict minimal or no harm on the environment or may rebuild or renew resources through their use.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The present disclosure provides an environmentally friendly soil and ground treatment compound useful for fertilizing trees, crops, grasses and other plants. In general, the compound utilizes (1) a wood product particulate, (2) wood or agricultural crop ash and biochar, crop compost or residue, and (3) a natural nitrogen source derived from a by-product that originated in a living plant.

Sawdust from timber milling or processing operations is an excellent source of wood product particulate. Timber mills and manufacturing facilities produce sawdust as a by-product in the processing or manufacturing of traditional forest products. Sawdust is used in pulp and paper milling, pellets for pellet stoves, stoves for cooking food, animal bedding, and fuel for energy and heat generation, but environmentally responsible disposal of excess "waste" sawdust often comprised of sawdust and bark remains an issue for owners and operators of timber mills and manufacturing facilities. In light of its availability and low procurement cost, sawdust and bark from both softwood and hardwood can be used as a wood product particulate according to the present disclosure. Rice hulls or other crop husks, chaff or skins also provide waste by-product which may be substituted for sawdust and further add a nitrogen component.

Wood ash and biochar or agricultural crop ash and biochar, like sawdust, is generated as a by-product of an industrial or agricultural process or is a result of food preparation processes such as wood or biomass cook stoves. Industrial combustion of wood for the generation of power results in the production of wood ash and biochar, which is often used as a soil amendment or disposed of in landfills. Wood ash and biochar is readily commercially available, often at or near sources of wood product particulate such as sawdust.

According to the disclosure, the wood or agricultural crop product particulate is combined with a quantity of wood or crop ash and biochar. Preferably, the wood product or agricultural crop particulate and the wood or agricultural crop ash and biochar are mixed in a ratio of approximately ten to forty percent (10% to 40%) wood or agricultural crop product particulate to approximately ten to forty percent (10% to 40%) wood or agricultural crop ash and biochar by volume. Wood or crop product particulate, ash and biochar or crop biochar, and waste by-product or green biomass (or a combination of both) plus hardwood and/or softwood sawdust/crop waste mixed in these ratios are effective in providing enhanced growth of trees, crops, and other plants. A compound having a ratio of ten to forty percent (10-40%) ash and biochar, plus twenty to eighty percent (20-80%) waste by-product from fruit or vegetable or other crop processing or agricultural bio-energy processing or green forest, agricultural, or aquatic biomass, plus ten to forty percent (10-40%) wood sawdust/crop waste has been proven to be particularly effective as a fertilizer.

The percentage of each product used is adjusted to produce the desired level of nitrogen and is dependent on the level of nitrogen in the waste by-product to determine the ratio of how much ash and biochar and sawdust or waste are included. Levels of nitrogen are monitored in the manufacturing process to meet the needs of consumers and label minimums in accordance with known methods and legal requirements.

The present disclosure provides a method for fertilizing plants. The method includes the steps of obtaining nitrogen from a fruit or vegetable waste water process or timber mill waste water process, agricultural bio-energy processes or green forest waste, agricultural, or aquatic particulate, or any combination thereof, and mixing the particulate with a quantity of wood or crop ash and biochar and wood or crop waste particulate and applying to or incorporating the resulting compound into the soil surrounding trees and other plants by mechanical or manual means.

In the manufacturing process, the ingredients are sifted through a power screen plant with a ¼ inch diameter screen, blended together in a rotating mixer, run through a dryer that spins with augers inside, and then beaten in a hammer mill to achieve a finer consistency. The resulting fertilizer mixture may be left in its "sawdust" like state or heat pelletized through a known compacting, pelletization process for easier application. It may also be pressed into a paper or other biodegradable wrapping around seedlings for early nutrient needs in the tree's life. Such pelletization and pressing processes are known and will not be described in detail herein. Lignin in the sawdust, chaff or crop residue, provide the binder for the pellet form of the product.

The shelf life is indefinite as long as the fertilizer is protected from moisture exposure even after pelletization. The resulting manufactured product is stored and displayed in paper, plastic, biodegradable or wood containers. Various packaging sizes accommodate varying volume and handling needs of customers. All sizes are normally palletized for shipping to dealers or other customers.

The product may be tilled into the soil around shrubs, trees, fruits and vegetables or other agricultural crops or grasses or a broadcast spreader may be utilized to apply to agricultural crops, grasses and ornamental plants, or it may be furrowed, drilled or otherwise incorporated into the seeding process with crop seeds. The product may also be converted to liquid to utilize spray application. Application rates vary according to type of plant. Trees benefit from a cup of product at planting and subsequent treatment each year. Flowers and vegetables benefit from application of ⅓ cup every 4-6 weeks during growing season. Agricultural crop application is 300-500 lbs. per acre depending on nitrogen needs and soil conditions. Label recommendations will suggest use of gloves in handling the product and soil testing to determine nitrogen needs, but the product is not caustic and because of its natural ingredients, is not known to be a health hazard.

The compound described above, as well as its uses and methods of manufacturing are part of a larger, environmentally responsive and sustainable process, as depicted in FIG. 1, which is described in more detail hereinafter.

According to the process of the disclosure, the fertilizer is additionally used to promote growth and increase the yield of field crops such as wheat or other biomass crops, forests, lawns, turf, hay crops, shrubs, nurseries, fruit trees, vegetables, flowers, and other crops. The environmental impact of the soil treatment compound and method of making and using is designed to promote reclaiming waste by-product from trees and biomass power plants, recycling refuse that might otherwise become an environmental eyesore or hazardous waste, and renewing and converting the waste and refuse into multiple products that enhance growth and safety. Thus, the compound disclosed herein is ideally formed of recycled products that are 100% organic and chemical free, use no animal products or by-products, and serve as an alternative to existing applications and products that may harm the environment.

Additional ingredients are also provided to enhance nitrogen content from biodegradable food and plant by-products that are a residual of fruit, timber, crop, vegetable, or other crop processing and/or bio-energy processes.

Nominal amounts of the product are needed, and two to four small applications are recommended annually. The application has been shown to reduce the water requirement of treated lawns and plants, and it allows nitrogen to be better synthesized into the plants. In addition, it helps replenish fiber and enhance aeration in the soil profile and is not harmful to pets or livestock.

The foregoing benefits are achieved when the product is properly used, such as tilled into the soil and around shrubs, trees, fruits, and vegetables, or other agricultural products and crops. It can be spread over grass, turf, or soil with a broadcast spreader and followed up with an application of water or mixed with water and use a sprayer to distribute the fertilizer.

Potential sources of needed raw products include biomass ash and biochar created at power plants, such as the Avista power plant in Kettle Falls, Wash., as well as other power generation facilities. While the ash and biochar can be obtained free or relatively inexpensively, it may require a Beneficial Use Exemption from the Department of Ecology to remove, transport, and store the ash and biochar if the by-product is obtained from a DOE regulated facility. Sawdust can be obtained from sources that provide both high grade, fine sawdust for fertilizers, as well as lesser quality supply for other applications.

Crop residue can be freely obtained from farm crops and chaff and hulls can be freely obtained from food processing plants or farming units.

EXAMPLE 1

The following example is provided as an illustration of use of the compound of the present disclosure for gardens, fruits, vegetables, herbs, shrubs, and trees. It is important to note that the product must be kept dry until use. It is recommended that gardening gloves be worn when handling the product. A soil analysis should be completed before adding this compound to the soil.

| | Amount to Apply: | | |
|---|---|---|---|
| Use for: | New | Existing | Frequency of Application |
| Trees and shrubs | 1 cup | 1 cup | Feed at planting time |
| Flowers | 1/3 cup | 1/3 cup | Annuals: Every 4-6 weeks |

-continued

| | Amount to Apply: | | |
|---|---|---|---|
| Use for: | New | Existing | Frequency of Application |
| Vegetables | 1/3 cup | 1/2 cup | Perennials: Feed after first bloom and every 4-6 weeks throughout growing season |
| Crops | | 100-500 lbs./acre | Depending on crop variety and soil conditions |

The major nutrient analysis for this organic fertilizer having a minimum N—P—K ratio of 4-1-3 is as follows:

| Total Nitrogen (N) | 4% |
|---|---|
| Available Phosphate (P205) | 1% |
| Soluble Potash and biochar (K20) | 3% |
| Calcium (Ca) | .0005% |
| Sulfur (S) | .0002% |
| Boron (B) | .0010% |
| Iron (Fe) | .0007% |
| Manganese (Mn) | .0089% |
| Molybdenum (Mo) | .0002% |
| Zinc (Zn) | .0003% |

The foregoing is derived from one or more of the following: wood or agricultural crop ash and biochar, bio-energy or food and feed processing, pine and cedar sawdust, and agricultural crop waste.

In another embodiment, the minimum raw materials to make the minimum N—P—K are by volume 10% mint or crop residue, 20% coffee grinds or beans, 20% biochar, 20% sludge, 10% coffee chaff or hulls, and 20% sawdust. Aquatic plants can replace the mint or crop residue.

Turning to FIG. 1, shown therein is a diagram of a renewable cycle in which field and fruit crops, and aquatic crops as well as timber source trees provide the components of the compound. More particularly, field, aquatic, and fruit crops provide waste by-products, from fruit, vegetable, aquatic, and timber processing and agricultural bio-energy processing. The timber source trees provide the sawdust and the wood ash and biochar. All of these are combined to form the natural, organic, chemical free and sustainable fertilizer. Ideally, these are screened into separate piles before being combined. Once combined, the compound can be used in a variety of forms. Preferably, it is used in a pelletized form.

The field, aquatic, and fruit crops also produce by-products that can be used for fuel pellets or chips, such as when combined with the timber. This in turn can be used for cogeneration of power, such as electric power. The timber source trees can also provide wood products as illustrated in FIG. 1. As can be seen, the natural, organic, chemical free and sustainable fertilizer formed from the field, aquatic, and fruit crops and timber source trees is used as a fertilizer for these products, providing a renewable and environmentally conscious, socially responsible source of fertilizer.

In an alternative aspect of the present disclosure, the constituents would include the incorporation of mycorrhizae to the formula listed above, which would be applied in a liquid or dry form after the pelletization of the fertilizer. Mycorrhizae is a by-product of plant roots, and it is found in or on roots of almost all plants. If some tree roots are being used in lieu of sawdust, then mycorrhizae is already present naturally from the roots. Hence, additional mycorrhizae can be applied if needed or desired or in the event no tree roots are being used. If applied in liquid form, it would be sprayed in a mist application to the pellets just prior to packaging. If applied in dry form, roots are ground into flour and the flour is dusted into each bag of fertilizer pellets. Mycorrhizae can also be acquired in a dry powder form from a commercial supplier and if in dry form be dusted over the pellets. If in a liquid form it could be sprayed in a mist over the pellets prior to packaging. The application is a light application of the powder or mist over the pellets as they are moved along a conveyor line, ideally at a location between a cooling tower and bagging.

No human waste water treatment, human waste by-product, fish or animal waste by-product is used in the process of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An organic fertilizer, consisting essentially of:
an organic fertilizing mixture having only dried plant-based materials, including by volume 10% wood, 15% wood biochar, and 75% nitrogen source material, wherein the fertilizer is heat pelletized.

2. The fertilizer of claim 1 wherein the wood comprises sawdust or agricultural crop waste.

3. The fertilizer of claim 1 wherein the wood comprises biochar generated by pyrolysis.

4. The fertilizer of claim 1, wherein minimum raw materials to make Nitrogen-Phosphorus-Potassium (N—P—K) are by volume 10% mint or crop residue, 20% coffee grinds or beans, 20% biochar, 20% sludge, 10% coffee chaff or hulls, and 20% sawdust.

5. A fertilizer, consisting essentially of:
an organic fertilizing compound of only dried plant-based materials, including wood or agricultural crop particulate, wood biochar formed by pyrolysis, and nitrogen source material, the nitrogen source material comprising natural source dried waste by-product from waste water treatment of food, aquatic, or crops or timber processes and/or waste by-products or residual from agricultural bio-energy processes, or a by-product created from food, aquatic, crop, or timber processing, and the nitrogen source material also comprises natural resource crop biomass or food product, wherein the organic fertilizing compound is in a heat pelletized form.

6. The fertilizer of claim 5 wherein the wood biochar comprises biochar generated as a by-product of one of either a timber processing or wood co-generation power plant processing or an agricultural process.

7. A fertilizer of only dried plant-based materials, consisting essentially of:
a fertilizer mixture having only wood or agricultural crop particulate, wood biochar, and nitrogen source material, the fertilizer mixture comprising, by volume, 10% of the wood or crop particulate, 15% of the wood or crop ash and biochar that is formed by pyrolysis, and 75% of the nitrogen source material, the nitrogen source material formed of dried waste by-product or residue, or natural source crop biomass or food product such as coffee beans, chaff or other agricultural, aquatic, and forest by-products, the fertilizer mixture having a heat pelletized form.

8. The fertilizer of claim 7 wherein the nitrogen source material comprises natural source dried waste by-product from waste water treatment of food, aquatic, or crops or timber processes and/or waste by-products or residual from agricultural bio-energy processes, or a by-product created from food, aquatic, crop, or timber processing, and the nitrogen source material also comprises natural resource crop biomass or food product.

* * * * *